(12) United States Patent
Yong

(10) Patent No.: US 7,360,889 B2
(45) Date of Patent: Apr. 22, 2008

(54) UNIVERSAL CLIP-ON EYEGLASSES

(76) Inventor: Gao Yong, No. 113, Sha Men Road, Wen Zhou City, Zhe Jiang Province (CN)

( * ) Notice: Subject to any disclaimer, the term of this patent is extended or adjusted under 35 U.S.C. 154(b) by 289 days.

(21) Appl. No.: 11/300,199

(22) Filed: Dec. 13, 2005

(65) Prior Publication Data

US 2007/0002273 A1    Jan. 4, 2007

(30) Foreign Application Priority Data

Jun. 29, 2005    (CN) .................. 2005 1 0080115

(51) Int. Cl.
*G02C 9/00* (2006.01)
(52) U.S. Cl. ..................... 351/47; 351/48; 351/57; 351/58; 351/124
(58) Field of Classification Search ............. 351/47, 351/48, 57, 58, 124, 126, 128, 129, 130
See application file for complete search history.

(56) References Cited

U.S. PATENT DOCUMENTS 5,159,359 A * 10/1992 Pauly et al. ............... 351/128

7,246,899 B2 * 7/2007 Xie ........................ 351/47

* cited by examiner

*Primary Examiner*—Hung X. Dang
(74) *Attorney, Agent, or Firm*—Clement Cheng

(57) ABSTRACT

This invention relates to one kind of universal clip-on eyeglasses that is used on optical frames. The clip-on glasses is comprised of a clamping mechanism. The clamping mechanism clamps onto the bridge of the bottom eyeglasses through a stretchable clip. The two ends of the clamping mechanism are connected to the add-on lenses. The clamping mechanism is comprised of a master structure and a component that clamps on with a stretchable mechanism. The master structure is connected to the add-on lenses and the component has at least one mechanical clip that clamps onto the bridge of the bottom lenses. This invention allows the clip-on eyeglasses to be clipped onto the bridge of the bottom eyeglasses with a clamping mechanism that has clips. They are easy to put on as well as to take off. The clamping is secure and these clip-on eyeglasses can be universally used on a variety of bottom lenses.

20 Claims, 14 Drawing Sheets

UNIVERSAL CLIP-ON EYEGLASSES

This application claims foreign priority from China patent application 200510080115.7 filed Jun. 29, 2005 the disclosure of which is incorporated herein by reference.

FIELD OF THE INVENTION

This invention relates to one kind of universal clip-on eyeglasses that is used on optical frames.

BACKGROUND TECHNOLOGY

There are many types of add-on eyeglasses for double-layer eyeglasses. Some of them are attached to the bottom lenses through magnets, others are affixed to the bottom lenses with hooks. The traditional eyeglasses and the added-on glasses are sold in sets which means that one set of add-on glasses fits only a certain type of eyeglasses. That kind of arrangement is complicated and inconvenient to use or to carry.

There have been previous attempts to make a clip-on eyeglass frame for clipping to a bottom lenses bridge. Inventor Yiling Xie proposed a flexible spring to make resilient arms as described in Detachable shelter frame for mounting in front of a primary spectacle frame, as described in U.S. Pat. No. 6,464,352 issued Oct. 15, 2002, the disclosure of which is incorporated herein by reference. Although resilient, the arms may be flimsy and require adjustment by tools. Therefore, it is desired that the clip on mechanism the resilient, easy to use and not require adjustment.

SUMMARY OF THE INVENTION

This invention overcomes the shortcomings of the current technology by providing one kind of universal clip-on eyeglasses that is easy to put on, as well as to take off from an optical frame. To achieve the above-mentioned goal, this invention provides one kind of clip-on eyeglasses that can be universally applied to optical frames. The universal clip-on eyeglasses include a clamping mechanism. The clamping mechanism clamps onto the bridge of the bottom eyeglasses through a stretchable clamp. The two ends of the clamping mechanism are connected to the lenses.

The clamping mechanism is comprised of a master structure and a clipping component that hooks onto the optical frame through a stretchable part. The clamping component has at least one mechanical clamp that clips onto the bridge of the bottom lenses with a mechanical clip.

When compared to the current technology, this invention presents these advantages:

This invention allows the clip-on eyeglasses to be clipped onto the bridge of the bottom eyeglasses through with a clamping mechanism that has clips. They are easy to put on as well as to take off. The clamping is secure. These clip-on eyeglasses can be universally used on a variety of bottom lenses.

Furthermore, the construction of the two clipping components adopted for the mechanical clips in this clamping mechanism are simple and easy to use.

DETAILED DESCRIPTIONS OF THE PREFERRED EMBODIMENTS

Together with the attached illustrations, the following is a detailed description of the actual implementation of this invention. Implementations are embodiments.

This invention of universal clip-on eyeglasses includes of a clamping mechanism. The clamping mechanism has a mechanical clip that clips onto the bridge of the bottom eyeglasses. the clamping mechanism is connected to the lenses. The clamping mechanism has two stretchable components, one of the components is connected to the lenses, i.e., the bridge of the clip-on eyeglasses. At least one of the mechanical clips, which clamps onto the bridge of the bottom lenses through the mechanical action, is attached to the other clipping component. The bridge of the bottom lenses is clamped between the bridge of the clip-on eyeglasses and the clips.

Implementation 1

Figure 11:
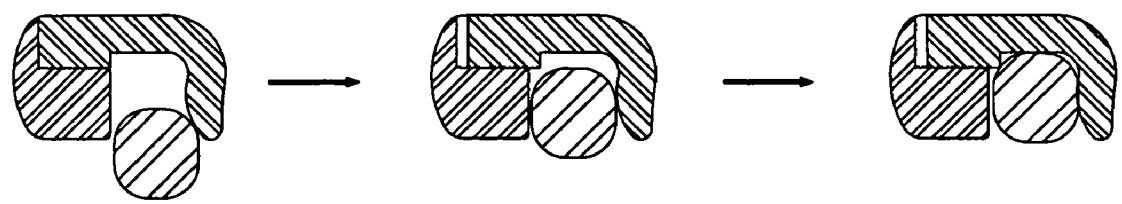
FIG. 11 are illustrations of the principal operation of the mechanical clamp as described in Implementation 1 of this invention.
Figure 12:
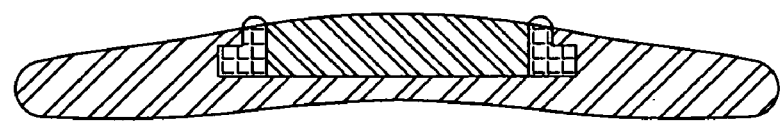
FIG. 12 is a cross-sectional illustration of the clamping mechanism showing the mutually complementing effect as described in Implementation 1 of this invention, and also showing the directions in which the clamping mechanism cannot move as described in Implementation 1 of this invention.
Figure 12:
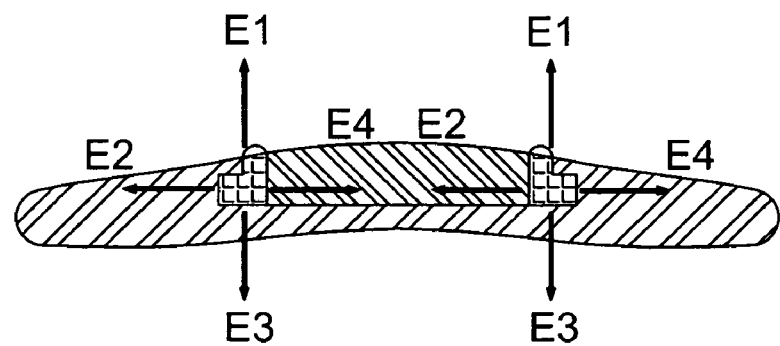

See FIGS. 1-4. The clamping mechanism is comprised of the master structure (1) and the component (2). The master structure (1) and the lenses (3) are connected together by a connector using rivets, clips, locks, or soldering, as shown in FIG. 3. In the middle of the master structure (1) is a cut-out section (11). The front wall (113) of the cut-out section (11) forms an aesthetic and neatly integrated section in the front of the master structure (1) and it pushes against the front part of the component (2) and serves as a locking device. Inside the cut-out section (11) is located a positioning structure (12). The positioning structure (12) can be a design with corresponding depressions and ridges, e.g., holes, dowels, furrows, and bumps. the component (2) is an integrated part that is composed of the cross bar (26) and two mechanical clips (21, 22). The cross bar (26) pushes against the positioning structure (12). The positioning structure (12) pins the middle section of the springing mechanism (26) at a correspondingly fixed position within the cut-out section (11) of the main structure (1). When the bridge of the bottom eyeglasses is inserted into the clip-on eyeglasses, the mechanical clips (21, 22) are being pulled backward and, using the forward thrusting springing action created by the alteration of the shape of the cross bar (26), clamp onto the bridge of the bottom eyeglasses tightly. On either side of the two mechanical clips (21, 22) of the component (2) are protruding lips (23) that stick into the tiny notches (111, 112) on either side of the cut-out section (11) and the lips interlock precisely with the notches (111, 112). The mutually complimenting interlocks can be rectangular, round, diamond, or triangular in shape. The pre-existing tension of the springing mechanism (26) squeezes tightly together the master structure (1) and the clipping component (2). The positioning structure (12) locks with the cover (6) which forms a cavity with the master structure (1) and holds the clipping mechanism (2) and the springing mechanism (26) in place. The lower two sides (61, 62) of the cover (6) form the stopping points for the backward movement of the clipping mechanism (2). It allows the clipping mechanism (2) to move in pre-defined directions within the cavity through the positioning mechanism (63) the cover (6) and the components (1, 2) are joined together and form one integral piece, which makes the clamping mechanism an integral piece that could clamp onto the bottom eyeglasses without slipping off easily. FIG. 11 are illustrations of the principal operation of the mechanical clamp as described in Implementation 1 of this invention. From left to right, the illustrations show the bridge of the bottom eyeglasses moving gradually into the space between the main structure (1) and the clipping mechanism (2) and is being clamped up. FIG. 12 is a cross-sectional illustration of the clamping mechanism showing the mutually complementing effect as described in Implementation 1 of this invention. FIG. 12 has an illustration showing the directions in which the clamping mechanism cannot move as described in Implementation 1 of this invention. That means the mechanical clip can only move in translation forward and backward in relationship to the master structure (1), but cannot move in the E1, E2, E3, or E4 directions. The thickness (h1, h2) of the connector (14), which is on the master structure (1) of the clamping mechanism, can be adjusted as needed, which means that the distance between the lenses and the outer surface of the bridge of the clip-on frame can be made to meet the various thicknesses of the lenses.

Implementation 2

Figure 1:
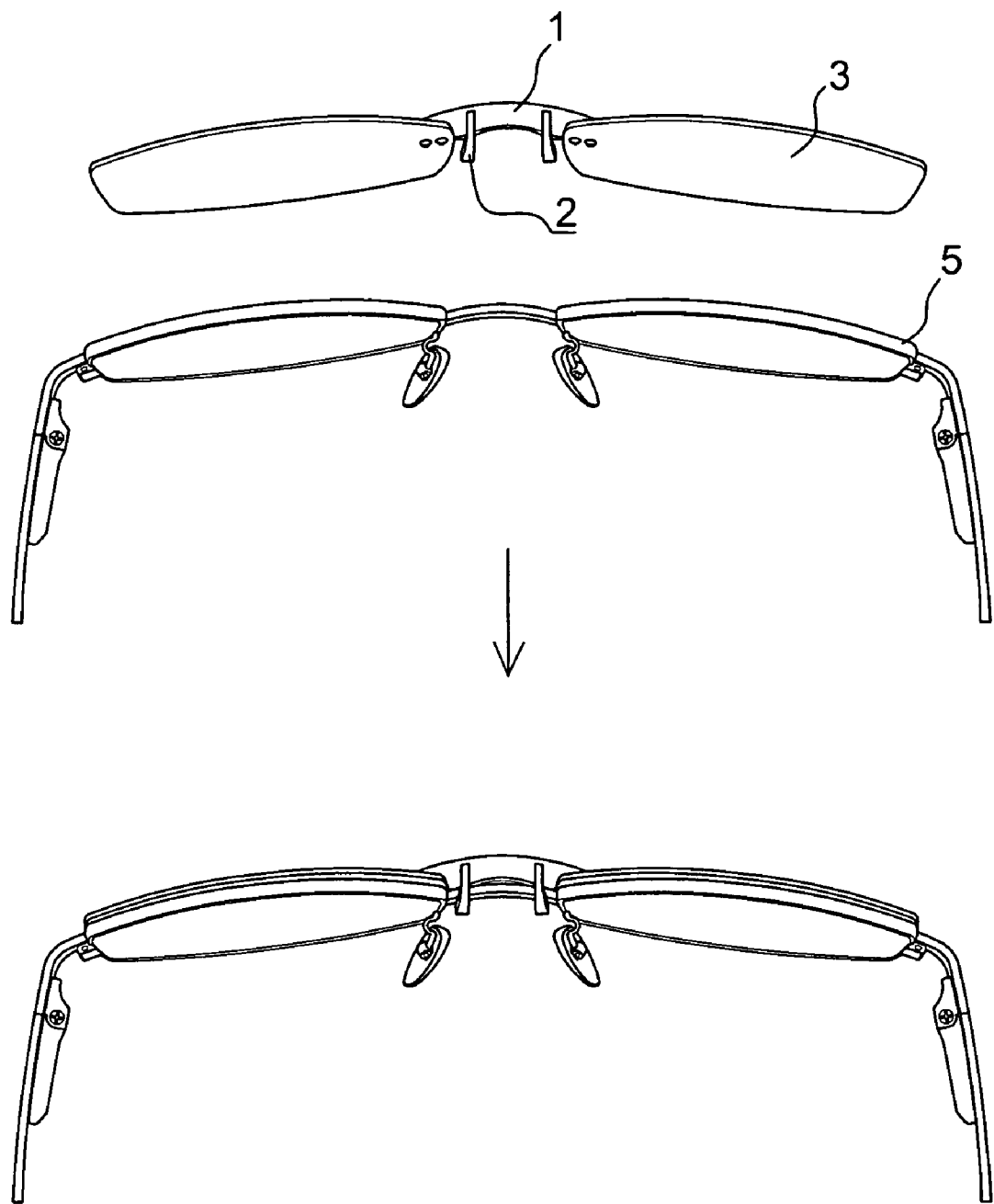
FIG. 1 is an illustration of the clamping of this invention onto the bottom eyeglasses as described in Implementation 1.
Figure 2:
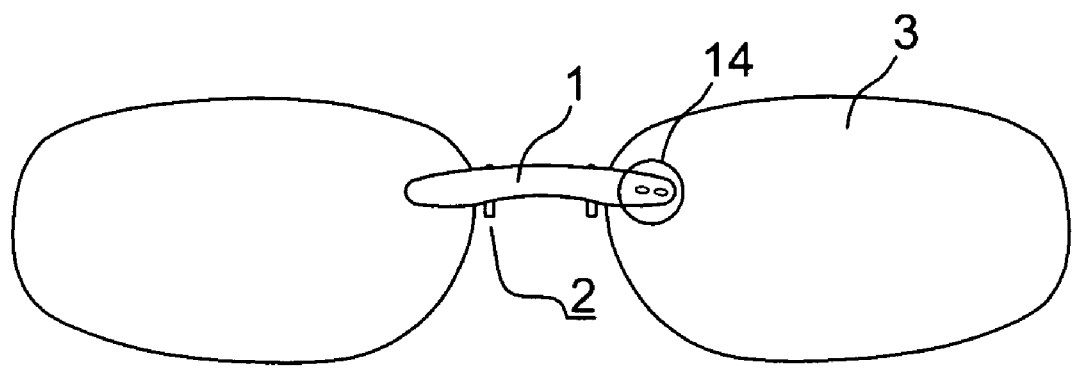
FIG. 2 shows three views front, back and top of the overall illustrations of this invention as described in Implementation 1.
Figure 2:
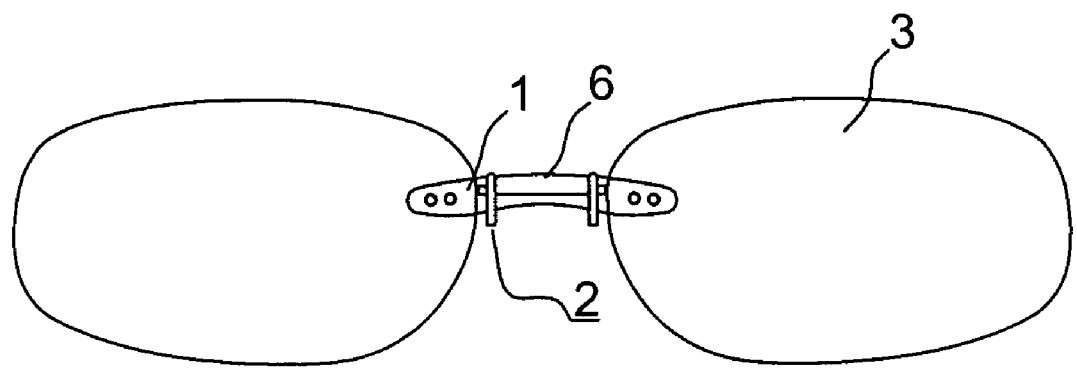
Figure 2:
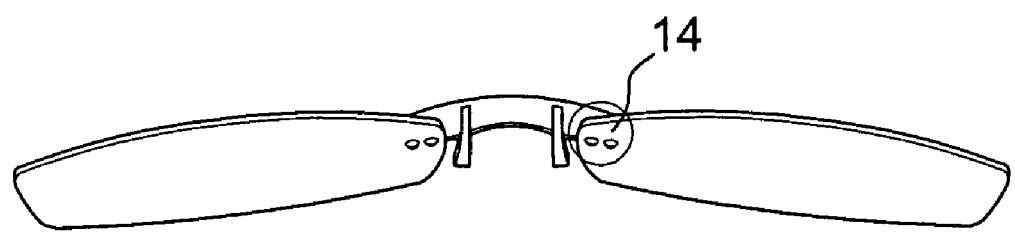
Figure 3A:
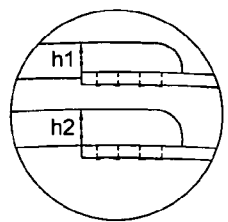
FIG. 3 are illustrations of the various structures of this invention of universal clip-on eyeglasses used on optical frames.
Figure 3B:
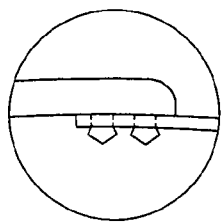
Figure 3C:
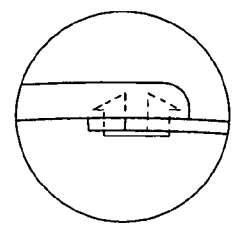
Figure 3D:
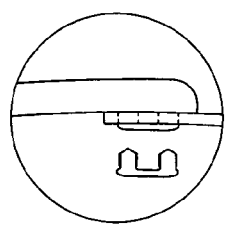
Figure 3E:
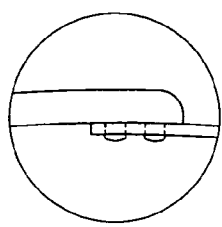
Figure 3F:
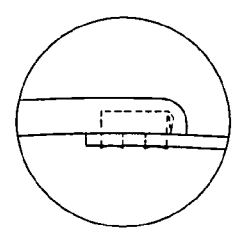
Figure 3G:
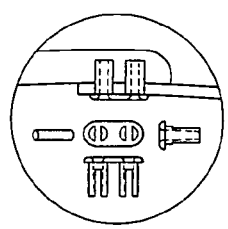
Figure 4:
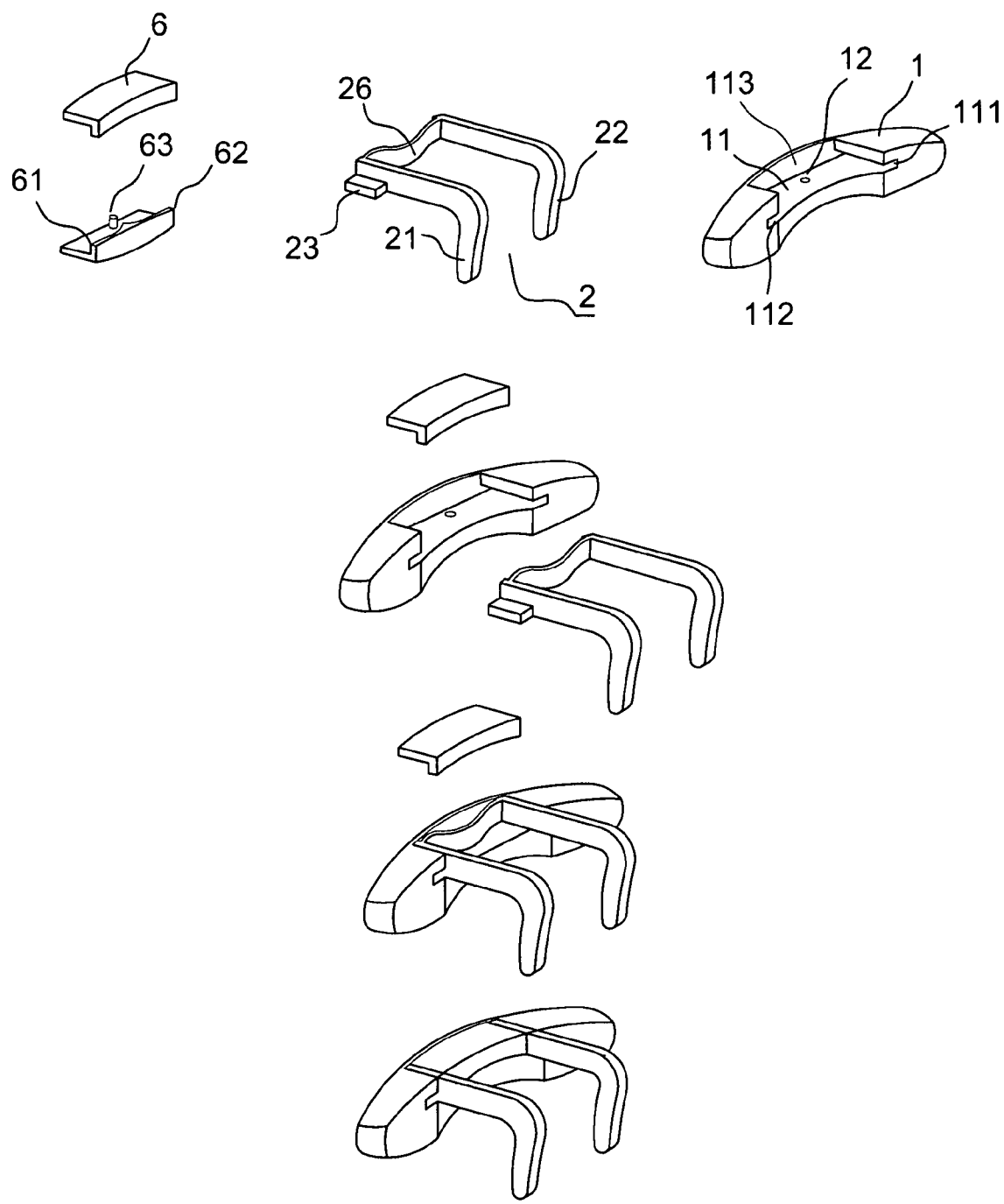
FIG. 4 are disassembled illustrations of the bridge as described in Implementation 1 of this invention.
Figure 5:
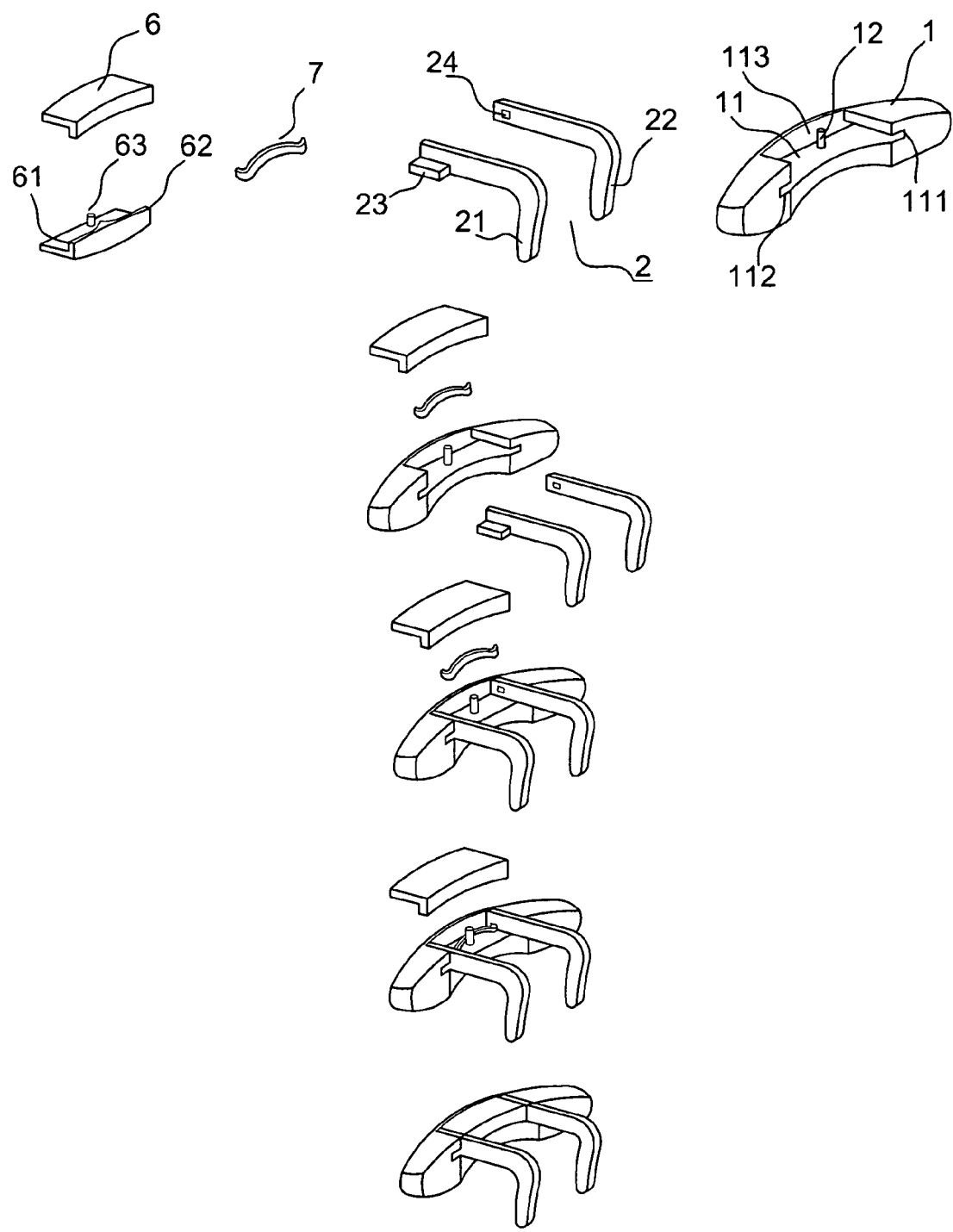
FIG. 5 are disassembled illustrations of the bridge as described in Implementation 2 of this invention.

See FIG. 5. The clamping mechanism includes the master structure (1) and the component (2). The master structure (1) and the lenses (3) are connected together by a connector using rivets, clips, locks, or soldering. In the middle of the master structure (1) is a cut-out section (11). The front wall (113) of the cut-out section (11) forms an aesthetic and neatly integrated section in the front of the master structure (1) and it pushes against the front part of the component (2) and serves as a locking device. Inside the cut-out section (11) is located a positioning structure (12). The component (2) includes two mechanical clips (21, 22). The flexible strip (7) pushes against the positioning structure (12). The positioning structure (12) keeps the middle of the flexible strip (7) in a relatively fixed position in the cut-out section (11) of the master structure (1). On the inner side of each of the mechanical clips is a hole (24). The two ends of the flexible strip (7) stick into the holes (24). When the bridge of the bottom eyeglasses is inserted into the clip-on eyeglasses, the mechanical clips (21, 22) are pulled backward and, the forward thrusting spring bias created by the alteration of the shape of the leaf spring flexible strip (7), clamp onto the bridge of the bottom eyeglasses tightly. On either side of the two mechanical clips (21, 22) of the component (2) are protruding lips (23) that stick into the tiny notches (111, 112) on either side of the cut-out section (11) and the lips interlock precisely with the notches (111, 112). The pre-existing tension of the flexible strip (7) squeezes tightly together the master structure (1) and the component (2). The positioning structure (12) locks with the cover (6) which forms a cavity with the master structure (1) and holds the component (2) and the springing mechanism (26) in place. The lower two sides (61, 62) of the cover (6) form the stopping points for the backward movement of the flexible strips (7). It allows the component (2) to move in pre-defined directions within the cavity. Because of the existence of the stopping points, the mechanical clips (21, 22) are prevented from being pulled off through the positioning mechanism (63) the cover (6) and the components (1, 2) are joined together and form one integrated piece, which makes the clamping mechanism an integral piece that could clamp onto the bottom eyeglasses without slipping off easily.

Implementation 3

Figure 6:
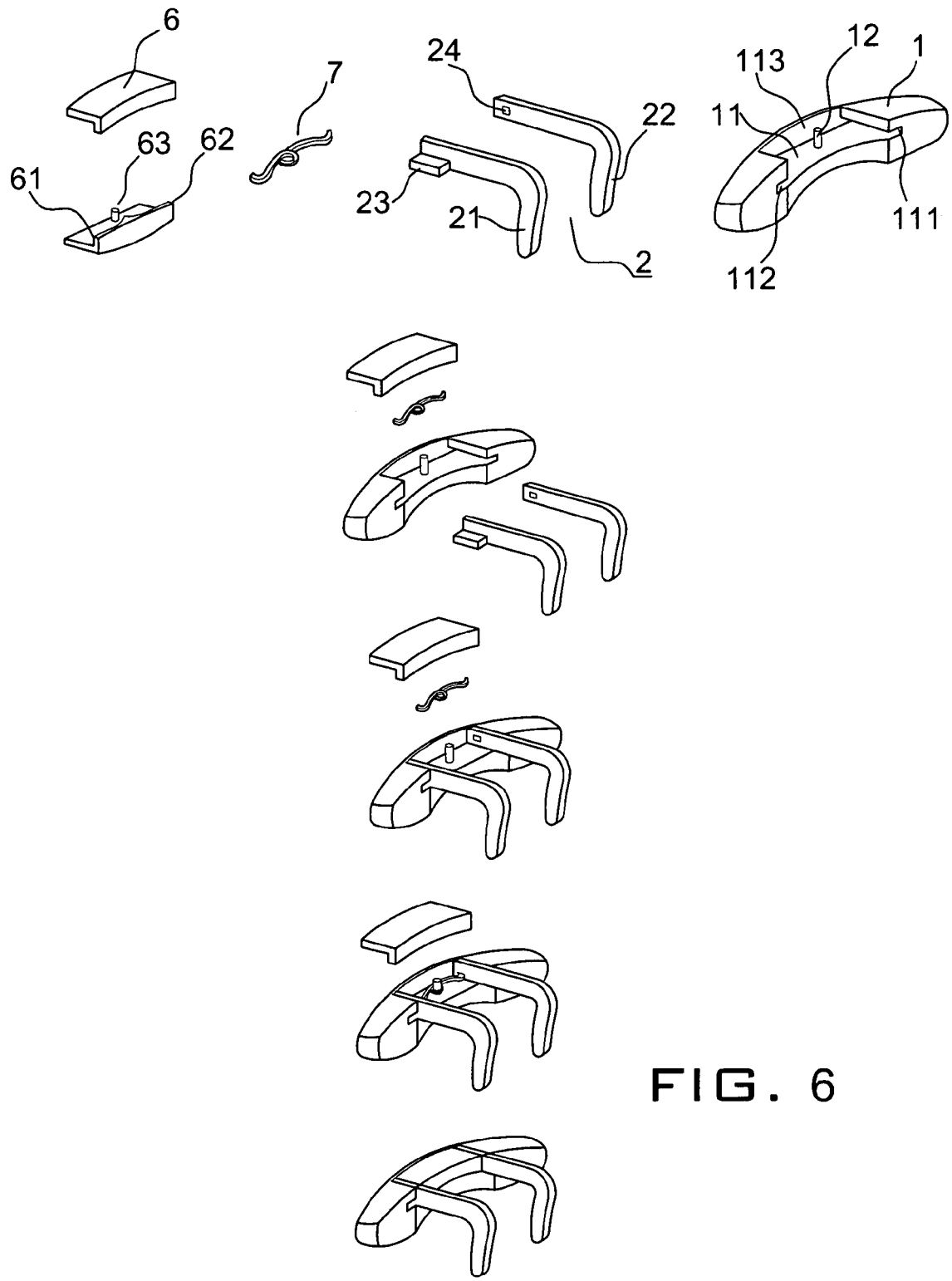
FIG. 6 are disassembled illustrations of the bridge as described in Implementation 3 of this invention.

See FIG. 6. The clamping mechanism includes the master structure (1) and the component (2). The master structure (1) and the lenses (3) are connected together by a connector using rivets, clips, locks, or soldering. In the middle of the master structure (1) is a cut-out section (11). The front wall (113) of the cut-out section (11) forms an aesthetic and neatly integrated section in the front of the master structure (1) and it pushes against the front part of the component (2) and serves as a locking device. Inside the cut-out section (11) is located a positioning structure (12) the component (2) includes two mechanical clips (21, 22). The looped spring (7) pushes against the positioning structure (12). The positioning structure (12) keeps the middle of the looped spring (7) in a relatively fixed position in the cut-out section (11) of the master structure (1). On the inner side of each of the mechanical clips is a hole (24). The two ends of the looped spring (7) stick into the holes (24). When the bridge of the bottom eyeglasses is inserted into the clip-on eyeglasses, the mechanical clips (21, 22) are being pulled backward and, using the forward thrusting springing action created by the alteration of the shape of the looped spring (7), clamp onto the bridge of the bottom eyeglasses tightly. On either side of the two mechanical clips (21, 22) of the component (2) are protruding lips (23) that stick into the tiny notches (111, 112) on either side of the cut-out section (11) and the pieces interlock precisely with the notches (111, 112). The pre-existing tension of the looped spring (7) squeezes tightly together the master structure (1) and the component (2). The positioning structure (12) locks with the cover (6) which forms a cavity with the master structure (1) and holds the component (2) and the springing mechanism (26) in place. The lower two sides (61, 62) of the cover (6) form the stopping points for the backward movement of the looped spring (7). It allows the mechanism (2) to move in pre-defined directions within the cavity. Because of the existence of the stopping points, the mechanical clips (21, 22) are prevented from being pulled off. Through the positioning mechanism (63) the cover (6) and the components (1, 2) are joined together and form one integrated piece, which makes the clamping mechanism an integral piece that could clamp onto the bottom eyeglasses without slipping off easily.

Implementation 4

Figure 7:
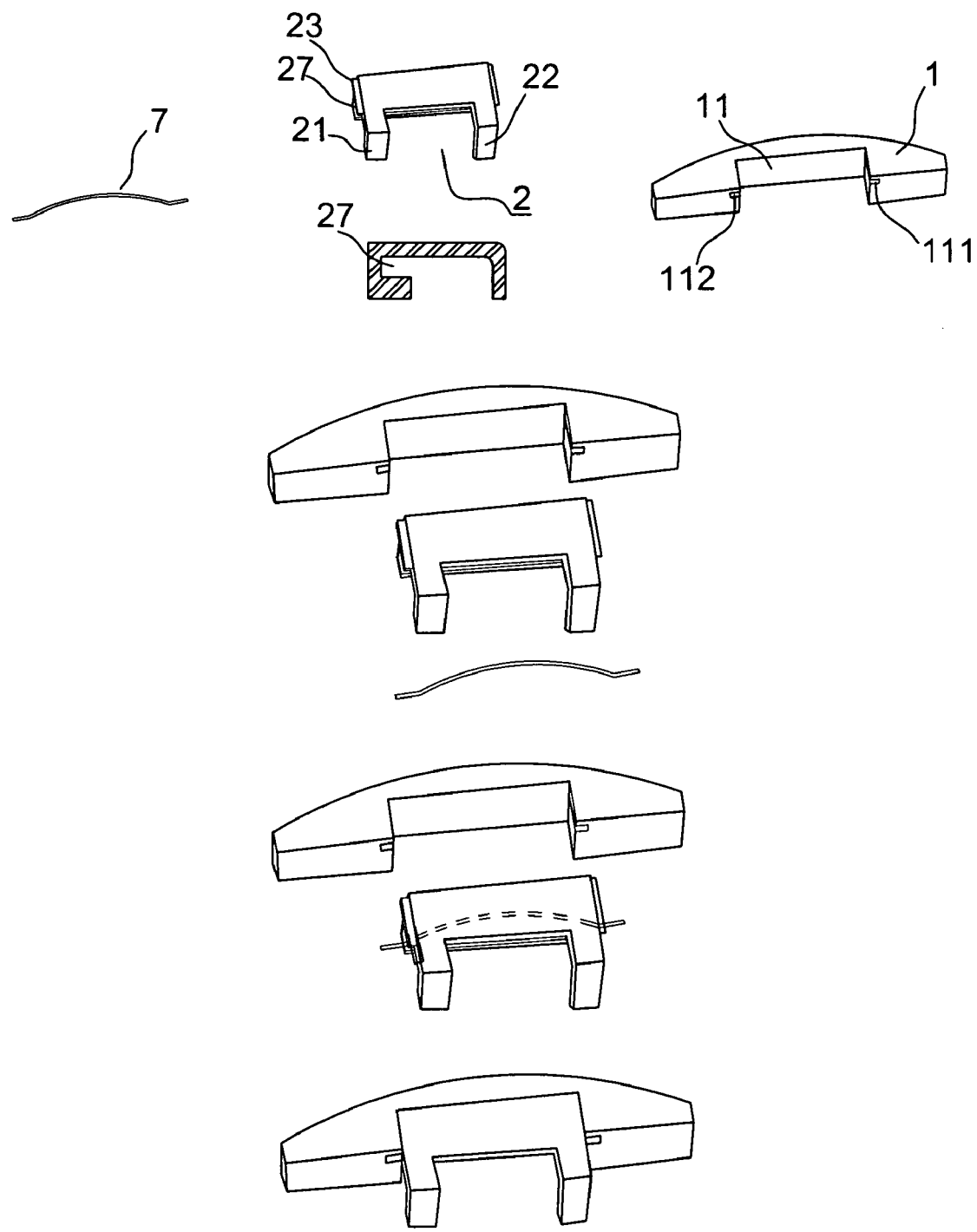
FIG. 7 are disassembled illustrations of the bridge as described in Implementation 4 of this invention.

See FIG. 7. The clamping mechanism includes two components (1, 2). Component 1 and the lenses (3) are connected together by a connector using rivets, clips, locks, or soldering, the whole mid section of component 1 can be cut-out (11). The central front part of component 2 is cut-out (27). A flexible strip (7) passes through the craved-out part (27) into component 1. The mechanical clips (21, 22) of component 2 are separate and apart from each other. On either side of component 2 are protruding lips (23) which extend into the tiny notches (111, 112) on the two sides of the cut-out area (11) and fit precisely in the notches (111, 112). The pre-existing tension of the flexible strip (7) squeezes tightly together component 1 and component 20.

Implementation 5

Figure 8:
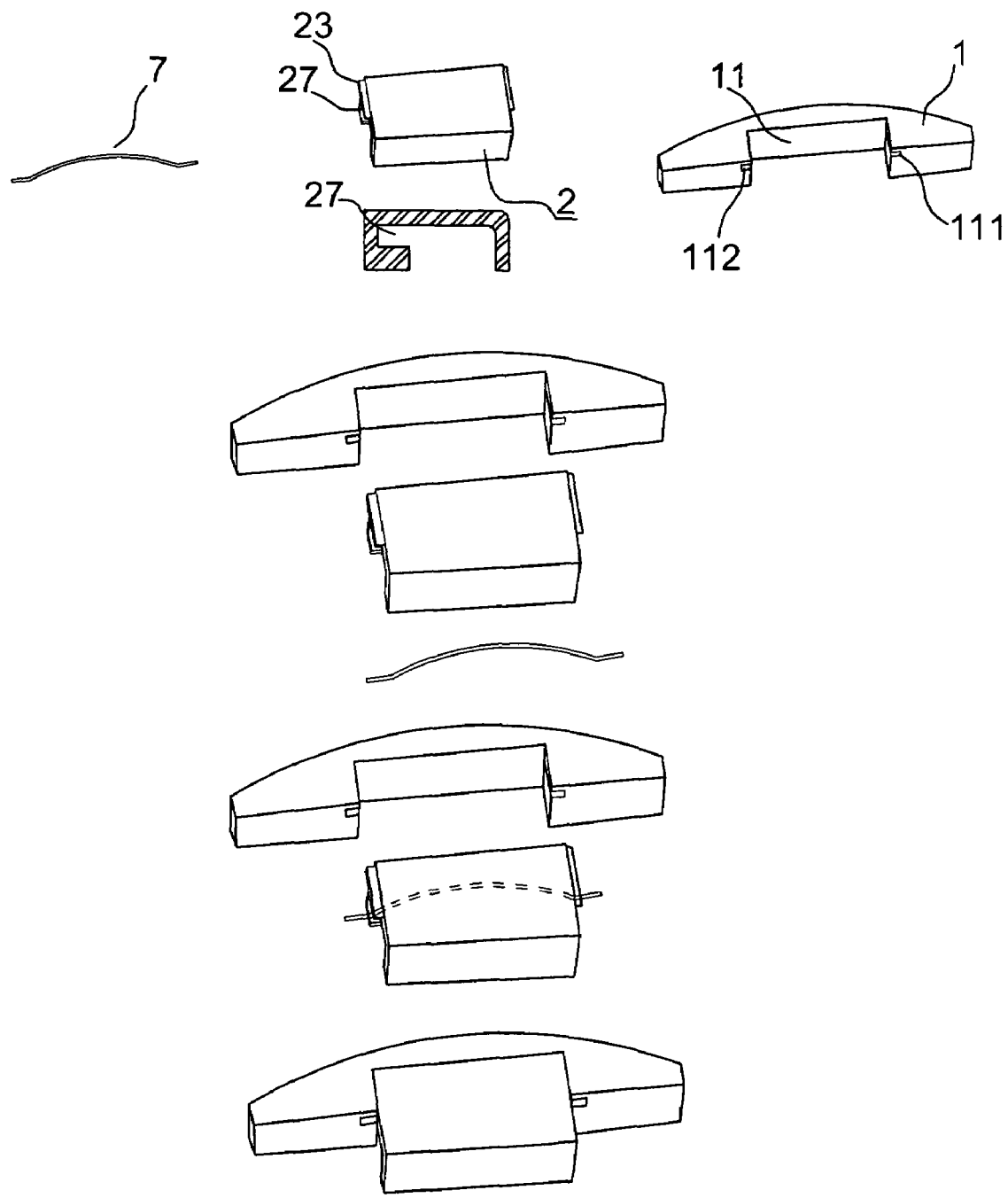
FIG. 8 are disassembled illustrations of the bridge as described in Implementation 5 of this invention.

See FIG. 8. The clamping mechanism includes two components (1, 2). Component 1 and the lenses (3) are connected together by a connector using rivets, clips, locks, or soldering, the whole mid section of component 1 can be cut-out (11). The central front part of component 2 is cut-out (27). A flexible strip (7) passes through the craved-out part (27) into component 1. The mechanical clips (21, 22) of component 2 are of one piece. On either side of component 2 are protruding lips (23) which extend into the tiny notches (111, 112) on the two sides of the cut-out area (11) and fit precisely in the notches (111, 112). The pre-existing tension of the flexible strip (7) squeezes tightly together component 1 and component 20.

Implementation 6

Figure 9:
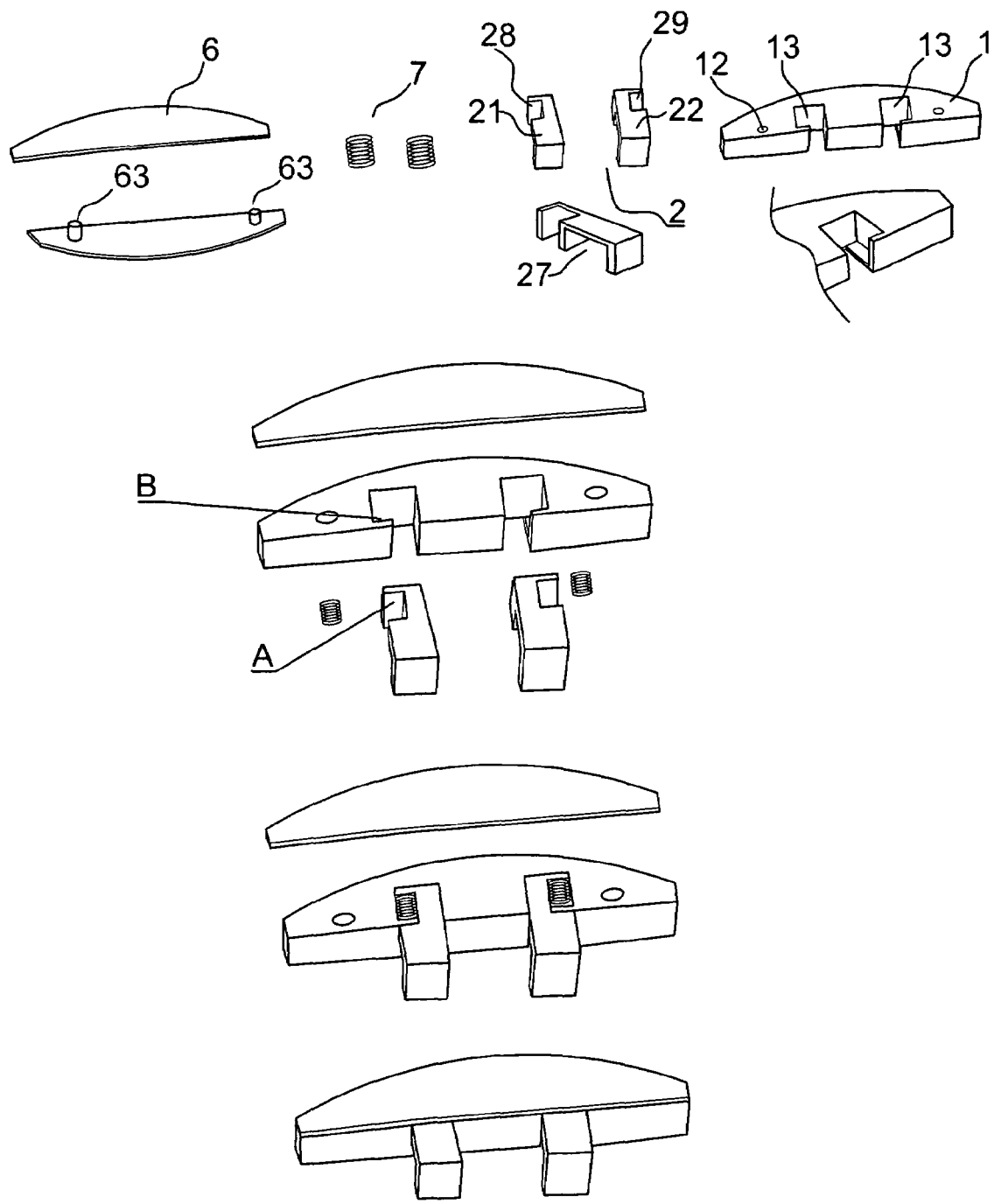
FIG. 9 are disassembled illustrations of the bridge as described in Implementation 6 of this invention.

See FIG. 9. The clamping mechanism includes two components (1, 2). Component 1 and the lenses (3) are connected together by a connector (14) using rivets, clips, locks, or soldering, the mid section of component 1 can be cut-out (13). There are "]" and "[" bracket shaped cut-outs (28, 29) in the front on the two sides of the mechanical clips (21, 22) of component 2. From the middle to the back is a cut-out section (27). The cut-out section (27) is to be placed on the bridge of the bottom eyeglasses. The back of the springs (7) push against wall B of the cut-out sections (13) of component 1. The front of the springs (7) push against wall A of the cut-out sections (28, 29) on the two mechanical clips (21, 22) of component 2. The springs (7) carry pre-existing tension that pushes component 1 and component 2 tightly together. On the cover (6) are placed pegs (63) that position and hold component 2 and the springs (7) in place. The pegs (63) match up with the positioning structures (12) making the clamping mechanism one integrated piece.

Implementation 7

Figure 10:
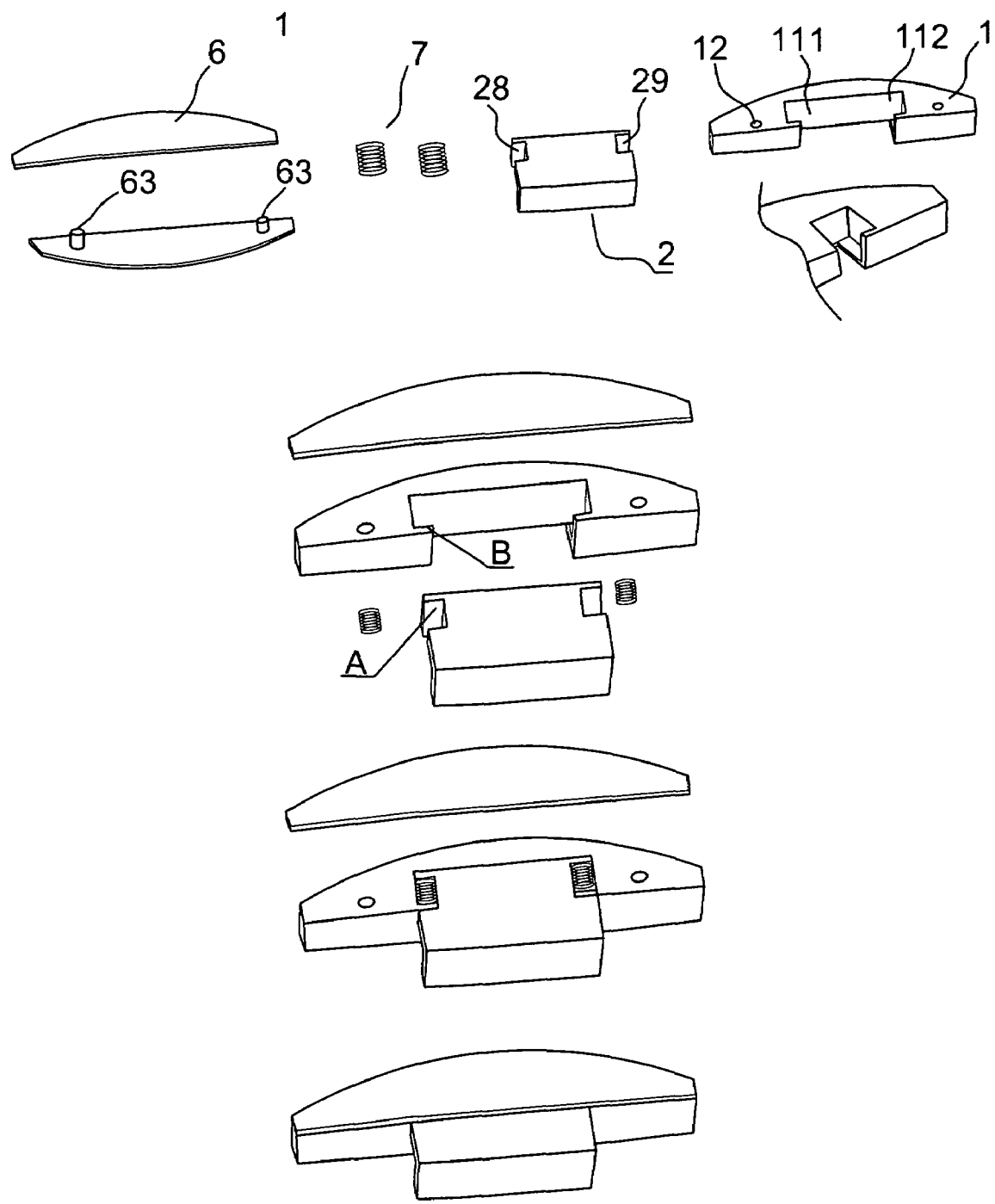
FIG. 10 are disassembled illustrations of the bridge as described in Implementation 7 of this invention.

See FIG. 10. The clamping mechanism includes two components (1, 2). Component 1 and the lenses (3) are connected together by a connector (14) using rivets, clips, locks, or soldering, the mid section of component 1 can be cut-out (13). The two mechanical clips (21, 22) of component 2 are of one piece. There are "]" and "[" bracket shaped cut-outs (28, 29) in the front on the two sides of the mechanical clips (21, 22) of component 2. The back of the springs (7) pushes against wall B of the cut-out sections (13) of component 1. The front of the springs (7) pushes against wall A of the cut-out sections (28, 29) of component 2. The springs (7) carry pre-existing tension that pushes component 1 and component 2 tightly together. On the cover (6) are placed pegs (63) that position and hold component 2 and the springs (7) in place. The pegs (63) match up with the positioning structures (12) making the clamping mechanism one integrated piece.

Implementation 8

Figure 15A:
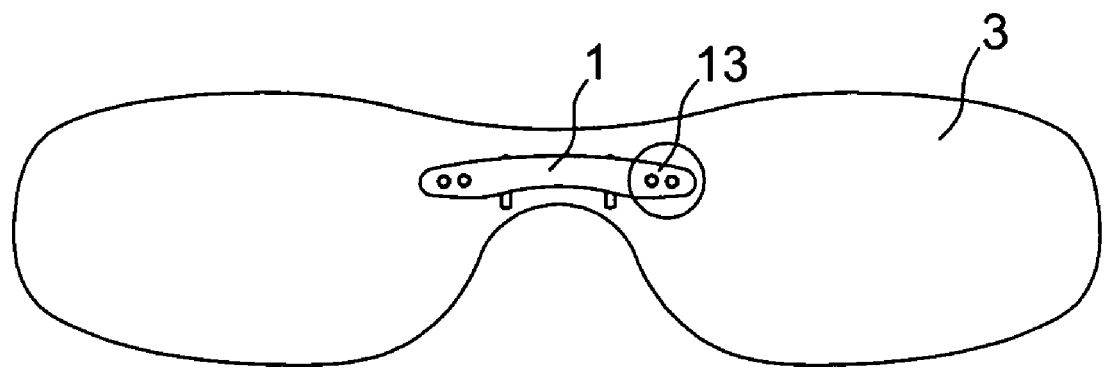
FIG. 15 are illustrations showing the front and back of the clamping mechanism of this invention being affixed onto conjoined lenses.
Figure 15B:
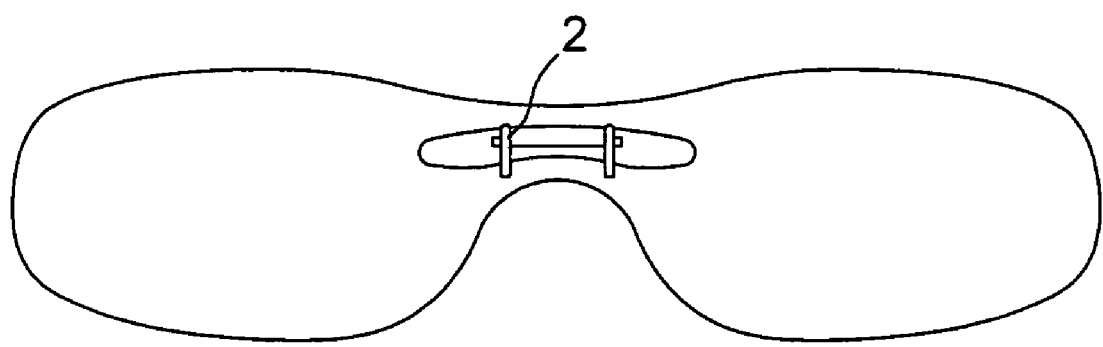

See FIG. 15. This implementation is similar to Implementation 1, except that the clamping mechanism includes two components (1, 2). The connector (13) on component 1 is attached to conjoined lenses of various shapes in front of the clamping mechanism. The lenses (3) can be a one piece lens, such as a goggle, a protective shield, or a curved sheet, which is affixed to the master structure (1) at the cut-out section in the middle.

Implementation 9

Figure 14:
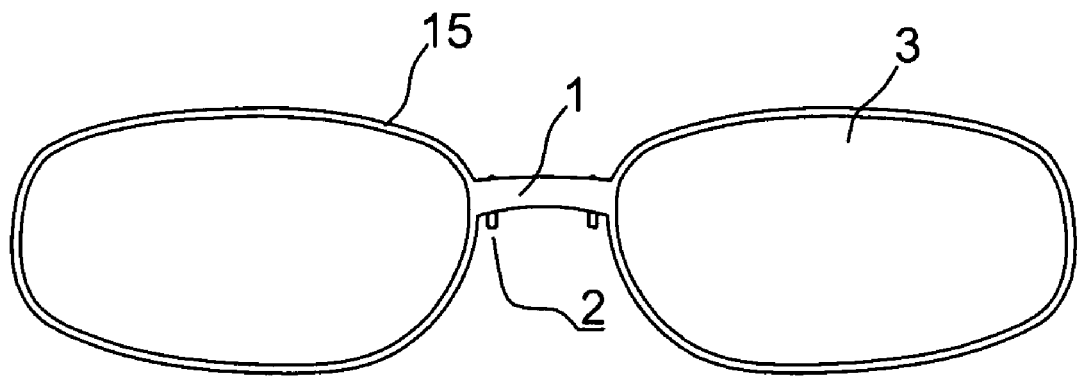
FIG. 14 are illustrations showing the clamping mechanism of this invention being affixed directly onto the lenses.
Figure 14:
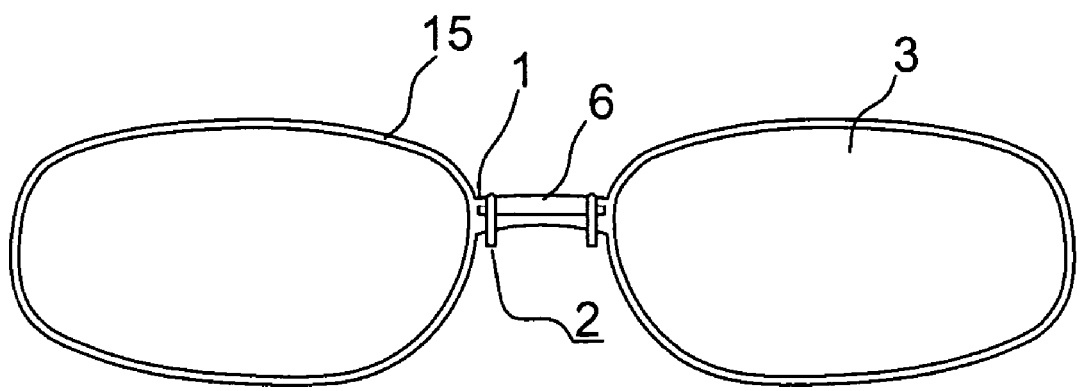

See FIG. 14. This implementation is similar to Implementation 1, except that the clamping mechanism includes two components (1, 2). The two ends of the master structure (1) and the master structure (1) can be of one piece. At each end of the master structure (1) is a structure (15) that has a groove to hold a lens in place. The structures (15) hold up the lenses and make the clamping mechanism and the lenses one integrated unit.

Figure 13:
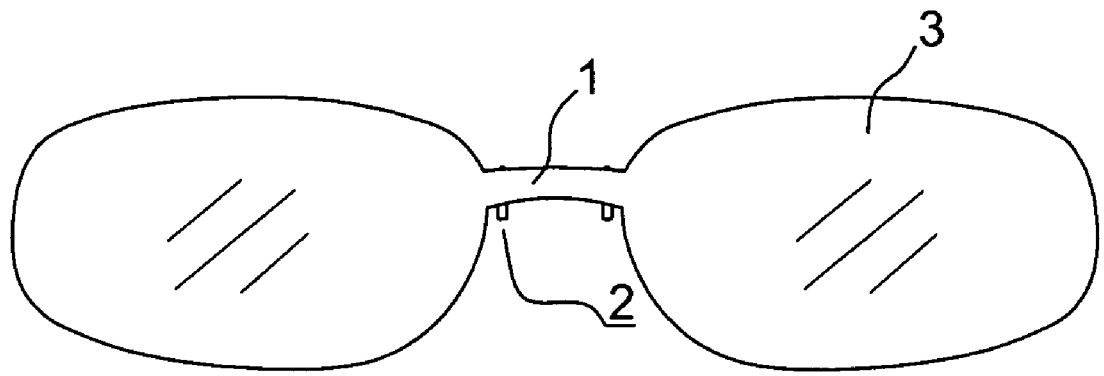
FIG. 13 are illustrations showing the lenses and the clamping mechanism of this invention connected into one piece.
Figure 13:
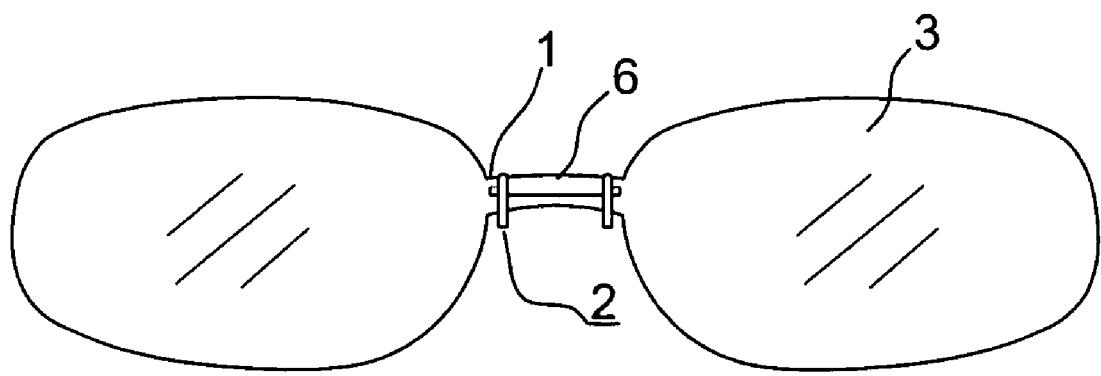

FIG. 13 are illustrations of the lenses and the clamping mechanism of this invention being connected into one integrated unit.

The invention claimed is:

1. A clip-on eyeglass frame for clipping to a bottom lenses bridge comprising: a frame body and a clipping mechanism disposed on the frame body, wherein the clipping mechanism comprises:
 a. a master structure having a connector connected to the frame;
 b. a pair of clip arms, for clipping to the bottom lenses bridge, wherein the pair of clip arms is constrained to forward and backward sliding motion; and
 c. a spring biasing the pair of clip arms toward a forward position.

2. The clip-on eyeglass frame of claim 1, wherein the master structure further comprises a cut-out section having a left notch and right notch in the cut-out section mating with protruding lips that protrude from the pair of clip arms into the a left notch and right notch to constrain the pair of clip arms to forward and backward sliding motion.

3. The clip-on eyeglass frame of claim 2, further comprising a positioning structure formed as a bump corresponding with a dimple, wherein a front wall of the cut-out section forms an integrated section in the front of the master structure as high as a top surface formed after a cover is assembled on the master structure, wherein the cover pushes against the front part of the clipping mechanism and serves as a locking mechanism, wherein the connector is selected from the group of a: rivet, clip, lock, or solder.

4. The clip-on eyeglass frame of claim 2, wherein the pair of clip arms fit into slots having a cross section shape selected from the group of: rectangular, round, diamond, or triangular; wherein the pair of clip arms move back and forth in the cavity formed between the master structure and the cover; wherein the pair of clip arms is made of one piece, flexible and have hooked ends in the shape of the number "7" to better attach to the bottom frame.

5. The clip-on eyeglass frame of claim 1, wherein the clipping mechanism further comprises: a master structure forming a cavity cut-out section slidably receiving the pair of clip arms; and a cover attaching over the cavity cut-out section, wherein on two sides on the bottom of the cover are locking positions retaining the pair of clip arms.

6. The clip-on eyeglass frame of claim 1, wherein the clamping mechanism and the lenses are made of a single piece, wherein at each end of the master structure is a closed ring-shaped structure, which has a groove to hold a lens in place.

7. The clip-on eyeglass frame of claim 1, wherein the lens is one piece.

8. The clip-on eyeglass frame of claim 1, wherein the connector thickness is adjustable on the master structure of the clamping mechanism, whereby the distance between the lenses and an outer surface of the bridge of a clip-on frame can be made to meet lenses of various thicknesses.

9. A clipping mechanism for clipping a clip-on eyeglass frame body to a bottom lenses bridge comprising:
   a. a master structure having a connector connected to the frame; wherein the master structure forms a cut-out section;
   b. a pair of clip arms, for clipping to the bottom lenses bridge, wherein the pair of clip arms is constrained to forward and backward sliding motion; wherein the top end of the pair of clip arms moves within the cut-out section and
   c. a spring biasing the pair of clip arms toward a forward position.

10. The clipping mechanism of claim 9, wherein the master structure further comprises a cut-out section having a left notch and right notch in the cut-out section mating with protruding lips that protrude from the pair of clip arms into the a left notch and right notch to constrain the pair of clip arms to forward and backward sliding motion.

11. The clipping mechanism of claim 10, further comprising a cover attaching over the cavity cut-out section, wherein on two sides on the bottom of the cover are locking positions retaining the pair of clip arms.

12. The clipping mechanism of claim 10, wherein the clamping mechanism and the lenses are made of a single piece, wherein at each end of the master structure is a closed ring-shaped structure, which has a groove to hold a lens in place.

13. The clipping mechanism of claim 10, wherein the lens is one piece.

14. The clipping mechanism of claim 10, wherein the connector thickness is adjustable on the master structure of the clamping mechanism, whereby the distance between the lenses and an outer surface of the bridge of a clip-on frame can be made to meet lenses of various thicknesses.

15. The clipping mechanism of claim 9, further comprising a positioning structure formed as a bump corresponding with a dimple, wherein a front wall of the cut-out section forms an integrated section in the front of the master structure as high as a top surface formed after a cover is assembled on the master structure, wherein the cover pushes against the front part of the clipping mechanism and serves as a locking mechanism, wherein the connector is selected from the group of a: rivet, clip, lock, or solder.

16. The clipping mechanism of claim 9, wherein the pair of clip arms fit into slots having a cross section shape selected from the group of: rectangular, round, diamond, or triangular; wherein the pair of clip arms move back and forth in the cavity formed between the master structure and the cover; wherein the pair of clip arms is made of one piece, flexible and have hooked ends in the shape of the number "7" to better attach to a bottom frame.

17. A clipping mechanism for clipping a clip-on eyeglass frame body to a bottom lenses bridge comprising:
   a. a master structure having a connector connected to the frame; wherein the master structure forms a cut-out section;
   b. a pair of clip arms, for clipping to the bottom lenses bridge, wherein the pair of clip arms is constrained to forward and backward sliding motion; wherein the top end of the pair of clip arms moves within the cut-out section and
   c. a spring biasing the pair of clip arms toward a forward position.

18. The clipping mechanism of claim 17, wherein the master structure further comprises a cut-out section having a left notch and right notch in the cut-out section mating with protruding lips that protrude from the pair of clip arms into the a left notch and right notch to constrain the pair of clip arms to forward and backward sliding motion; further comprising a positioning structure formed as a bump corresponding with a dimple, wherein a front wall of the cut-out section forms an integrated section in the front of the master structure as high as a top surface formed after a cover is assembled on the master structure, wherein the cover pushes against the front part of the clipping mechanism and serves as a locking mechanism, wherein the connector is selected from the group of a: rivet, clip, lock, or solder; wherein the pair of clip arms fit into slots having a cross section shape selected from the group of: rectangular, round, diamond, or triangular; wherein the pair of clip arms move back and forth in the cavity formed between the master structure and the cover; wherein the pair of clip arms is made of one piece, flexible and have hooked ends in the shape of the number "7" to better attach to a bottom frame.

19. The clipping mechanism of claim 18, wherein the clamping mechanism and the lenses are made of a single piece, wherein at each end of the master structure is a closed ring-shaped structure, which has a groove to hold a lens in place, wherein the lens is one piece.

20. The clipping mechanism of claim 18, wherein the connector thickness is adjustable on the master structure of the clamping mechanism, whereby the distance between the lenses and an outer surface of the bridge of a clip-on frame can be made to meet lenses of various thicknesses.

* * * * *